United States Patent
Masti et al.

(10) Patent No.: US 9,453,485 B2
(45) Date of Patent: Sep. 27, 2016

(54) FUEL RAIL ASSEMBLY WITH BRACKET AND ISOLATOR FOR MOUNTING

(71) Applicant: DELPHI TECHNOLOGIES, INC., Troy, MI (US)

(72) Inventors: Ravish S. Masti, Karnataka (IN); Christopher M Cass, Fairport, NY (US)

(73) Assignee: Delphi Technologies, Inc., Troy, MI (US)

(*) Notice: Subject to any disclaimer, the term of this patent is extended or adjusted under 35 U.S.C. 154(b) by 274 days.

(21) Appl. No.: 14/096,465

(22) Filed: Dec. 4, 2013

(65) Prior Publication Data

US 2015/0152831 A1 Jun. 4, 2015

(51) Int. Cl.
- *F02M 69/46* (2006.01)
- *F02M 55/02* (2006.01)
- *F16L 3/00* (2006.01)

(52) U.S. Cl.
CPC .............. *F02M 55/025* (2013.01); *F16L 3/00* (2013.01); *F02M 2200/857* (2013.01)

(58) Field of Classification Search
USPC ................... 123/470, 469, 468, 456; 29/888
See application file for complete search history.

(56) References Cited

U.S. PATENT DOCUMENTS

| | | | | |
|---|---|---|---|---|
| 4,352,510 A * | 10/1982 | Saito | ...................... | F16F 15/08 180/377 |
| 6,340,019 B1 * | 1/2002 | Eshleman | ............ | F02M 69/465 123/469 |
| 6,651,327 B1 * | 11/2003 | Alder | .................. | B21D 26/035 29/421.1 |
| 7,143,749 B1 * | 12/2006 | Colletti | ................ | F02M 69/465 123/469 |
| 7,159,569 B2 | 1/2007 | Keegan et al. | | |
| 7,347,190 B1 | 3/2008 | Keegan et al. | | |
| 7,516,735 B1 * | 4/2009 | Doherty | ............... | F02M 55/005 123/468 |
| 7,699,041 B2 | 4/2010 | Colletti et al. | | |
| 8,701,632 B2 * | 4/2014 | Solferino | ............... | F02M 61/14 123/470 |
| 2007/0163545 A1 * | 7/2007 | Beardmore | .......... | F02M 55/025 123/456 |
| 2008/0075403 A1 * | 3/2008 | Holt | ..................... | F02M 55/025 384/551 |
| 2008/0202472 A1 * | 8/2008 | Whatley | ............... | F02M 69/465 123/469 |
| 2009/0255511 A1 * | 10/2009 | Panchal | ............. | F02M 63/0225 123/456 |
| 2011/0108005 A1 * | 5/2011 | Nishizawa | ........... | F02M 55/025 123/469 |
| 2012/0214328 A1 * | 8/2012 | Downing | .................. | F16L 3/00 439/345 |
| 2013/0125864 A1 * | 5/2013 | Kannan | ................ | F02M 61/168 123/469 |
| 2015/0152831 A1 * | 6/2015 | Masti | ................... | F02M 55/025 123/470 |

* cited by examiner

*Primary Examiner* — Thomas Moulis
*Assistant Examiner* — Joshua A Campbell
(74) *Attorney, Agent, or Firm* — Joshua M. Haines

(57) ABSTRACT

A fuel rail assembly for supplying pressurized fuel to at least one fuel injector of an engine includes a hollow fuel rail extending along a fuel rail axis. The fuel rail includes an inlet for introducing the pressurized fuel into the fuel rail and at least one outlet for dispensing the pressurized fuel from the fuel rail. The fuel rail assembly also includes a bracket for attaching the fuel rail assembly to the engine. The bracket includes a fuel rail portion defining a first passage extending therethrough in the same direction as the fuel rail axis for receiving the fuel rail therewithin. The bracket also includes a mounting portion adjacent to the fuel rail portion and defining a second passage extending therethrough in the same direction as the fuel rail axis. The mounting portion is configured to receive a fastener for securing the fuel rail assembly to the engine.

23 Claims, 9 Drawing Sheets

FUEL RAIL ASSEMBLY WITH BRACKET AND ISOLATOR FOR MOUNTING

TECHNICAL FIELD OF INVENTION

The present invention relates to a fuel rail assembly for supplying pressurized fuel to fuel injectors of an internal combustion engine and more particularly a bracket for mounting such a fuel rail assembly to the internal combustion engine.

BACKGROUND OF INVENTION

In order to meet increasingly stringent fuel economy and emission requirements, some modern internal combustion engines employ fuel systems where fuel under high pressure, typically higher than 10 MPa, is injected directly into combustion chambers by fuel injectors In a typical system, several fuel injectors are connected to a single fuel rail assembly. The fuel rail assembly includes an inlet for receiving pressurized fuel from a fuel source and a plurality of outlets connected to respective fuel injectors. The fuel injectors are sequentially actuated to deliver fuel from the fuel rail to the combustion chambers in sequence with the operation of the engine.

FIGS. 8-11 of United States Patent Application Publication No. US 2011/0108005 A1 to Nishizawa et al. show a typical fuel rail assembly. The fuel rail assembly includes outlets which are aligned with the axis of the fuel rail while mounting brackets are fixed to the fuel rail by brazing such that the mounting brackets are offset from the outlets. When pressurized fuel is supplied to the fuel injectors, the pressurized fuel generates a force, cyclic in nature due to opening and closing of the fuel injectors and cycling of a high pressure pump, which attempts to push the fuel injectors away from the internal combustion engine in a direction that is in-line with each fuel injector respectively. This force must be resisted by the mounting brackets. In addition to the forces generated by the fuel injectors and the high pressure pump, vibrations from the operation of the internal combustion engine and dynamics of a motor vehicle traveling on a roadway may induce fatigue loading on the fuel rail assembly which must be resisted by the mounting brackets. However, since the mounting brackets are rigid and are rigidly fixed to the fuel rail, the braze joint is subject to cyclic stress which in time may result in fatigue failure.

What is needed is a fuel rail assembly which minimizes or eliminates one or more of the shortcomings as set forth above.

SUMMARY OF THE INVENTION

Briefly described, a fuel rail assembly is provided for supplying pressurized fuel to at least one fuel injector of a fuel consuming device. The fuel rail assembly includes a hollow fuel rail extending along a fuel rail axis. The fuel rail includes an inlet for introducing the pressurized fuel into the fuel rail and at least one outlet for dispensing the pressurized fuel from the fuel rail. The fuel rail assembly also includes a bracket for attaching the fuel rail assembly to the fuel consuming device. The bracket includes a fuel rail portion defining a first passage extending therethrough in the same direction as the fuel rail axis for receiving the fuel rail therewithin. The bracket also includes a mounting portion adjacent to the fuel rail portion and defining a second passage extending therethrough in the same direction as the fuel rail axis. The mounting portion is configured to receive a fastener for securing the fuel rail assembly to the fuel consuming device.

BRIEF DESCRIPTION OF DRAWINGS

This invention will be further described with reference to the accompanying drawings in which.

DETAILED DESCRIPTION OF INVENTION

Figure 1:
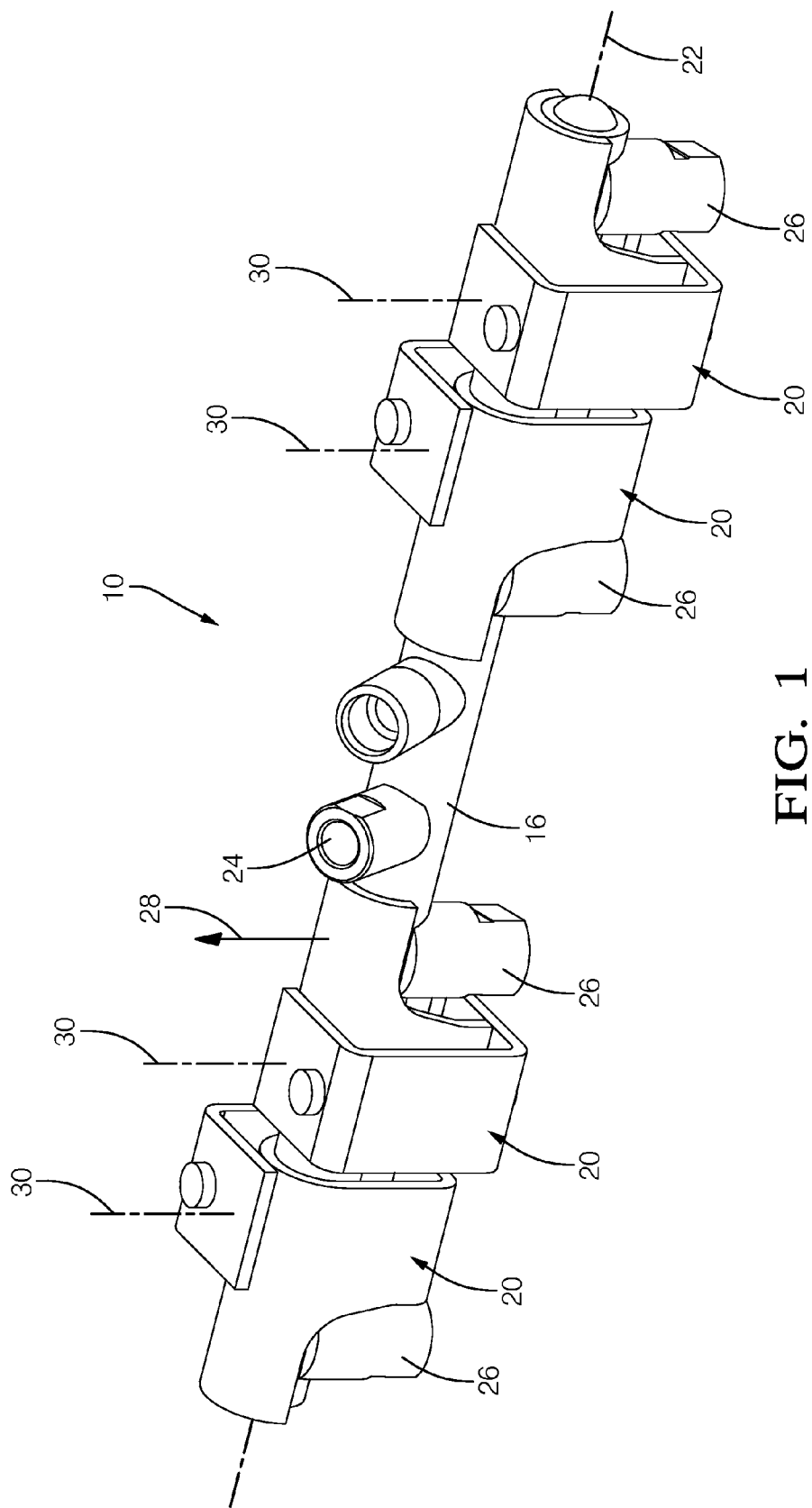
FIG. 1 is an isometric view of a fuel rail assembly in accordance with the present invention.
Figure 2:
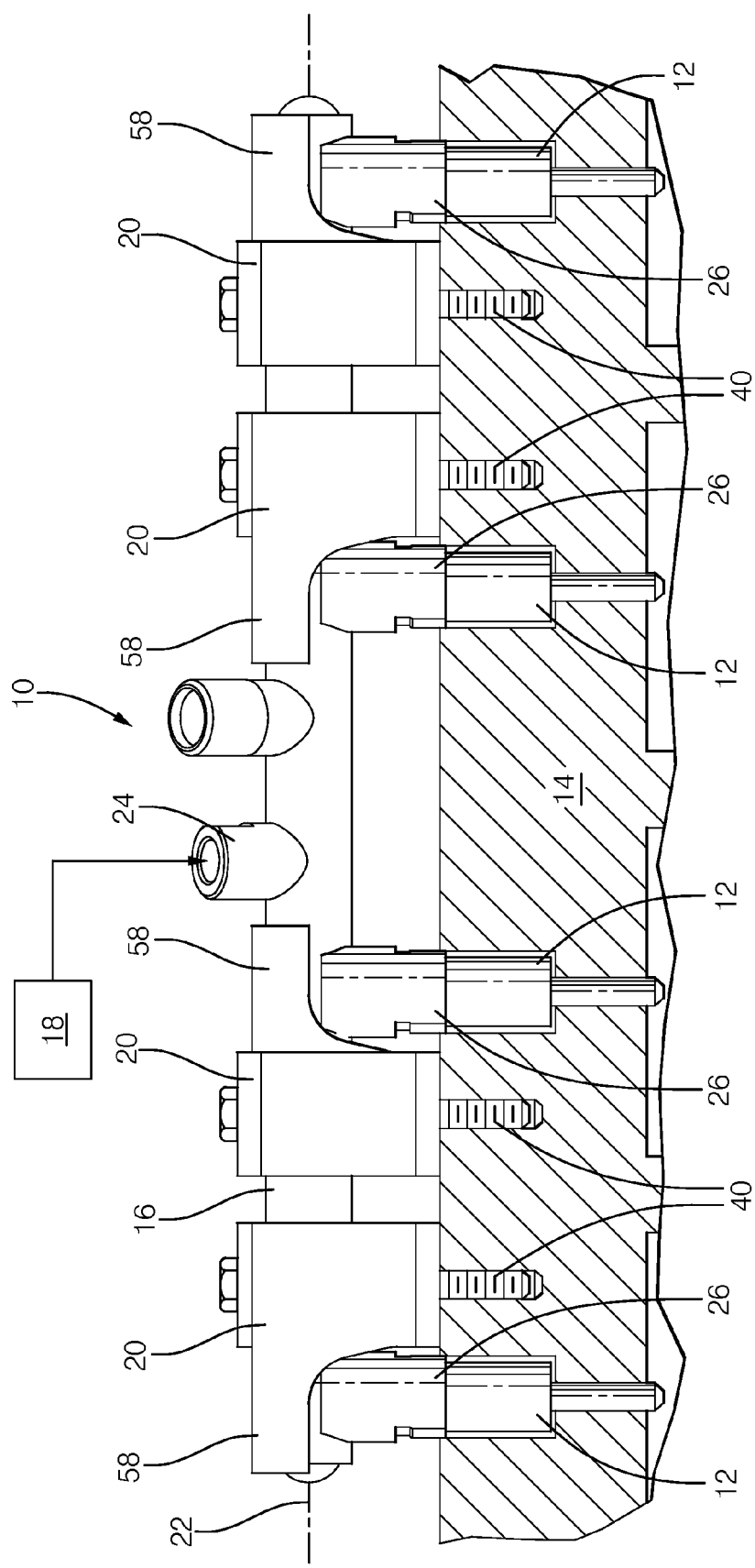
FIG. 2 is an elevation view of the fuel rail assembly of FIG. 1 now shown mounted to an internal combustion engine.

Reference will be made to FIGS. 1-2 which show a fuel rail assembly 10 in accordance with the present invention for supplying pressurized fuel to a plurality of fuel injectors 12 of a fuel consuming device illustrated as an internal combustion engine 14. Fuel rail assembly 10 includes a fuel rail 16 for providing a fuel path from a fuel source 18, for example a fuel pump, to fuel injectors 12. Fuel rail assembly 10 also includes a plurality of brackets 20 for attaching fuel rail assembly 10 to internal combustion engine 14. While four brackets 20 have been illustrated, it should now be understood that greater or lesser numbers of brackets 20 may be provided.

Fuel rail 16 is hollow and extends along a fuel rail axis 22. While fuel rail 16 is illustrated as generally cylindrical in cross-sectional shape, it should be understood that fuel rail 16 may be any cross-sectional shape that provides adequate strength to withstand the fuel pressure generated by fuel source 18 and provides sufficient volume to supply the required quantity of fuel to fuel injectors 12 to operate internal combustion engine 14. Fuel rail 16 includes an inlet 24 for introducing fuel from fuel source 18 into fuel rail 16. Fuel rail 16 also includes a plurality of outlets 26 such that each outlet 26 provides a path for fuel to be discharged from fuel rail 16 to a respective fuel injector 12. While four outlets 26 and four fuel injectors 12 have been illustrated, it should now be understood that greater or lesser numbers of outlets 26 and fuel injectors 12 may be provided. In operation, when pressurized fuel is supplied to fuel injectors 12 from fuel source 18, the pressurized fuel generates a force, cyclic in nature due to opening and closing of fuel injectors 12 and cycling of a high pressure pump (which may be fuel source 18), which attempts to push fuel injectors 12 away from internal combustion engine 14 in a direction indicated by arrow 28. This force must be resisted by fuel rail assembly 10, and more specifically, by brackets 20 along a pressure axis 30 of each bracket 20. Pressure axis 30 is substantially perpendicular to and aligned with fuel rail axis 22.

Figure 3:
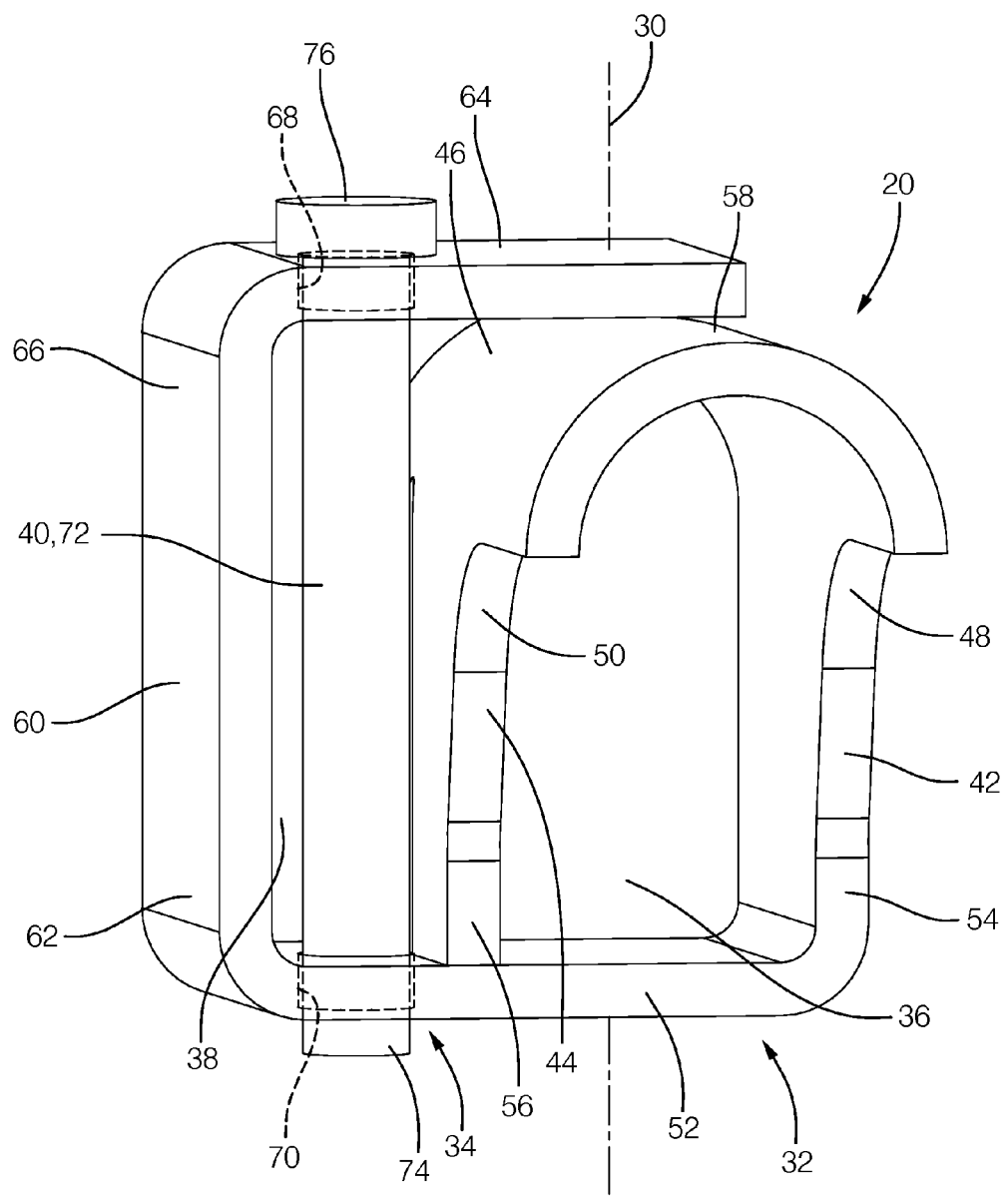
FIG. 3 is an isometric view of a bracket of the fuel rail assembly of FIGS. 1 and 2 for mounting the fuel rail assembly to the internal combustion engine.

With continued reference to FIGS. 1 and 2 and now with additional reference to FIG. 3, each bracket 20 includes a compartmentalized framework of walls defined by a fuel rail portion 32 and a mounting portion 34. Fuel rail portion 32 defines a first passage 36 extending therethrough in the same direction as fuel rail axis 22 for receiving fuel rail 16 therewithin. Fuel rail 16 is fixed to fuel rail portion 32 of bracket 20 as will be described in greater detail later. Mounting portion 34 defines a second passage 38 extending therethrough in the same direction as fuel rail axis 22. Mounting portion 34 of bracket 20 is configured to receive a fastener, illustrated as a bolt 40, for securing fuel rail assembly 10 to internal combustion engine 14.

Fuel rail portion 32 of bracket 20 includes a first sidewall 42 that is spaced laterally from pressure axis 30 and a second sidewall 44 that is spaced laterally from both pressure axis 30 and first sidewall 42 such that fuel rail 16 is positioned between first sidewall 42 and second sidewall 44. As shown, first sidewall 42 and second sidewall 44 may each be substantially planar and parallel to pressure axis 30, consequently, first sidewall 42 and second sidewall 44 may be substantially parallel to each other. Fuel rail portion 32 of bracket 20 also includes a first top wall 46 joining a top end 48 of first sidewall 42 to a top end 50 of second sidewall 44. First top wall 46 may be contoured to match a portion of the outer periphery of fuel rail 16 that is received within first passage 36, thereby closely following the outer periphery of fuel rail 16. Fuel rail 16 is metallurgically bonded to first top wall 46, for example, by brazing, welding, or soldering. Fuel rail portion 32 of bracket 20 also includes a bottom wall 52 joining a bottom end 54 of first sidewall 42 to a bottom end 56 of second sidewall 44 such that bottom wall 52 is spaced apart from fuel rail 16. As shown, bottom wall 52 may be planar and substantially perpendicular to first sidewall 42, second sidewall 44, and pressure axis 30. First sidewall 42, second sidewall 44, first top wall 46, and bottom wall 52 together form a continuous wall that completely surrounds fuel rail 16.

First top wall 46 may include a support arm 58 that extends in a direction substantially the same as fuel rail axis 22. Support arm 58 extends substantially far so as to be aligned with a respective outlet 26 along fuel rail axis 22 and such that support arm 58 is opposed to outlet 26. As shown, a smooth contoured transition is integrally formed between first sidewall 42 and support arm 58 and between second sidewall 44 and support arm 58 to further strengthen bracket 20 and reduce stress concentration. Alternatively, the smooth contoured transition may be separate pieces that are metallurgically bonded to first sidewall 42 and support arm 58 and to second sidewall 44 and support arm 58. In this way, support arm 58 adds support to fuel rail 16 to resist bending forces that exist due to bracket 20 being spaced axially along fuel rail 16 relative to fuel injector 12. While bracket 20 has been illustrated as having one support arm 58, it should now be understood that a second support arm may be provided which extends from first top wall 46 in a direction opposite of support arm 58. It should also now be understood that support arm 58 may be omitted if no further support is needed for fuel rail 16.

Mounting portion 34 of bracket 20 shares second sidewall 44 with fuel rail portion 32 of bracket 20 and also includes a third sidewall 60 that is spaced laterally from pressure axis 30, first sidewall 42, and second sidewall 44 such that second sidewall 44 is between first sidewall 42 and third sidewall 60. As shown, third sidewall 60 may be substantially planar and parallel to pressure axis 30, first sidewall 42, and second sidewall 44. Mounting portion 34 of bracket 20 also includes bottom wall 52 of fuel rail portion 32 such that bottom wall 52 joins a bottom end 62 of third sidewall 60 to bottom end 56 of second sidewall 44 and to bottom end 54 of first sidewall 42. Mounting portion 34 of bracket 20 also includes a second top wall 64 which joins a top end 66 of third sidewall 60 to fuel rail portion 32 of bracket 20. Second top wall 64 may be substantially planar and parallel to bottom wall 52. Second top wall 64 joins a top end 66 of third sidewall 60 to first top wall 46 such that second top wall 64 is metallurgically bonded to first top wall 46, for example, by brazing, welding, or soldering. Second sidewall 44, third sidewall 60, bottom wall 52, and second top wall 64 together form a continuous wall.

Second top wall 64 includes a first aperture illustrated as first bolt hole 68 extending therethrough and bottom wall 52 includes a second aperture illustrated as second bolt hole 70 such that second bolt hole 70 is aligned with first bolt hole 68. In this way, a shank portion 72 of bolt 40 extends through first bolt hole 68 and second bolt hole 70. A threaded portion 74 of bolt 40 threadably engages internal combustion engine 14 while mounting portion 34 of bracket 20 is captured between internal combustion engine 14 and a bolt head 76 of bolt 40. In this way, bolt 40 secures fuel rail assembly 10 to internal combustion engine 14 by clamping mounting portion 34 of bracket 20 between internal combustion engine 14 and bolt head 76.

Figure 4A:
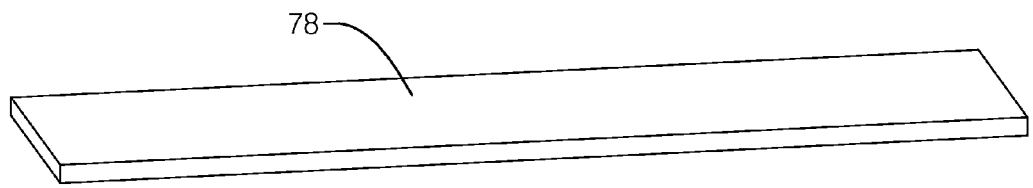
FIGS. 4A-4F shows a progression of steps for forming the bracket of FIG. 3.
Figure 4B:
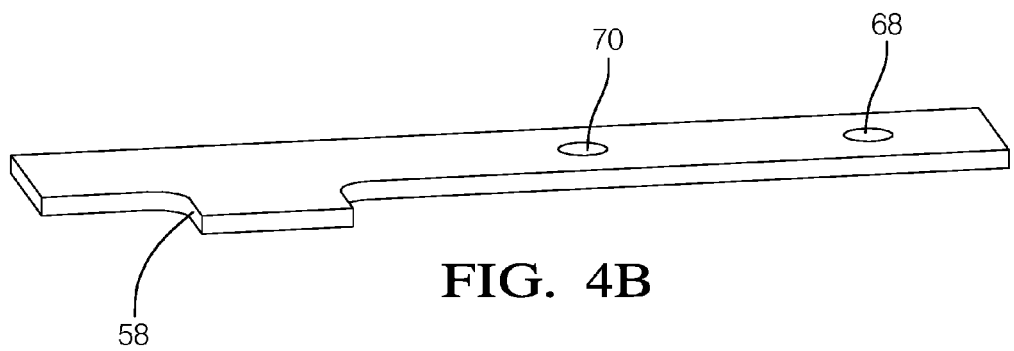
Figure 4C:
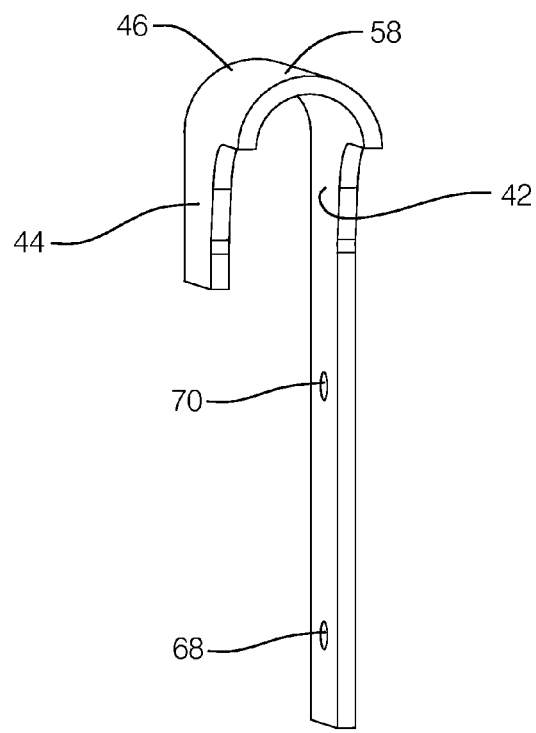
Figure 4D:
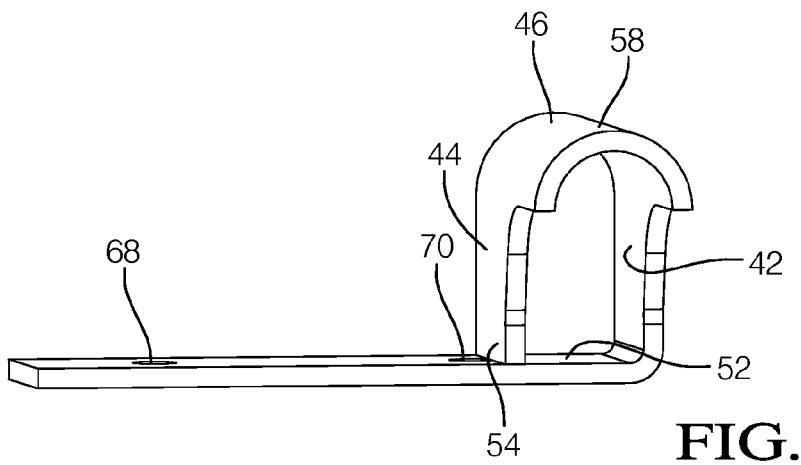
Figure 4E:
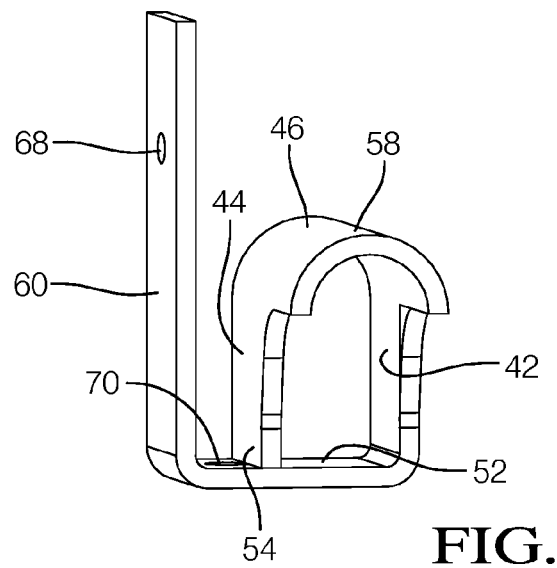
Figure 4F:
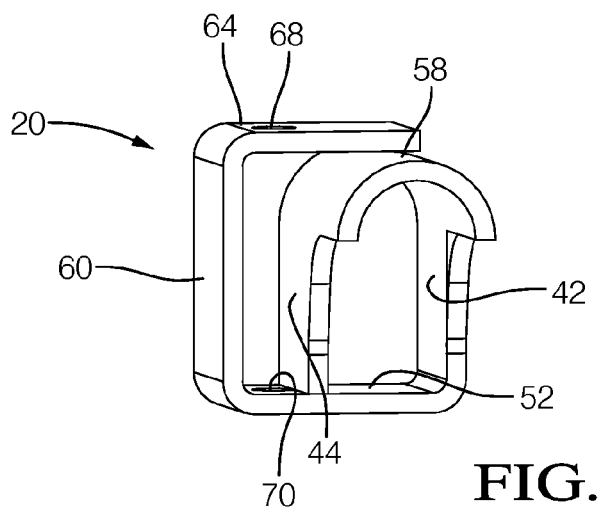

Now with reference to FIGS. 4A-4F, bracket 20 is preferably made from a single piece of sheet metal 78. Sheet metal 78 may be stamped or punched to shape in a plane, then bent or formed into a spatial object. As shown in FIG. 4A, sheet metal 78 may be provided for forming bracket 20. Now as shown in FIG. 4B, sheet metal 78 is formed in a punching or stamping operation to the appropriate shape that, when bent, will form bracket 20. Now as shown in FIG. 4C, a first bending operation may take place to define first sidewall 42, second sidewall 44, and first top wall 46. Now in a second bending operation as shown in FIG. 4D, bottom wall 52 is defined such that bottom wall 52 abuts bottom end 54 of second sidewall 44. Now as shown in FIG. 4E, a third bending operation takes place to define third sidewall 60. In a final bending operation as shown in FIG. 4F, second top wall 64 is defined such that second top wall 64 abuts first top wall 46. With bracket 20 now formed to shape, an operation may take place to metallurgically bond bottom end 54 of second sidewall 44 to bottom wall 52 and to metallurgically bond second top wall 64 to first top wall 46. While first bolt hole 68 and second bolt hole 70 have been illustrated as being formed in the punching or stamping operation shown in FIG. 4B, it should now be understood that first bolt hole 68 and second bolt hole 70 may be formed later in the formation bracket 20, for example, after all of the bending operations have taken place, and may be formed after bottom end 54 of second sidewall 44 is metallurgically bonded to bottom wall 52 and second top wall 64 is metallurgically bonded to first top wall 46. While FIGS. 4A-4F show one way to form bracket 20 from a single piece of sheet metal 78, it should now be understood that the walls may be formed in other sequences. It should also now be understood that bracket 20 may be formed from two or more pieces of sheet metal that are metallurgically bonded together.

Making bracket 20 having first sidewall 42, second sidewall 44, first top wall 46, bottom wall 52, third sidewall 60, and second top wall 64 produces a framework of box-shaped compartments which form closed-shell structural designs that provide an enhanced strength and help to better distribute operational loads applied to fuel rail assembly 10. This helps to reduce stress and improve resistance to static and dynamic loads and durability of fuel rail assembly 10. Bracket 20 is inherently strong by virtue of the compartmentalized framework of walls 42, 44, 46, 52, 60, and 64, support arm 58, and effective distribution of the material in a manner that improves the structural stiffness (in bending and torsion), and load redistribution. Consequently, this helps to improve the static and fatigue life of fuel rail assembly 10 during high pressure cycling and proof pressure loading that may lead to failure in fuel rail assemblies having solid brackets rigidly mounted to the fuel rail. Also advantageously, the metallurgical joint between fuel rail 16 and bracket 20 is not subjected to separation forces because the forces generated by the pressurized fuel tend to push fuel rail 16 into contact with bracket 20 rather than trying to separate them. Furthermore, the design of bracket 20 allows for low cost manufacturing since sheet metal and simple stamping, bending, and/or punching operations may be used for fabrication.

In order to further increase the strength of bracket 20, one or more of first sidewall 42, second sidewall 44, first top wall 46, bottom wall 52, support arm 58, third sidewall 60, and second top wall 64 may include strengthening features such as beads, ribs, and the like. The beads or ribs may be made by deforming the respective wall, or may be a separate piece that is metallurgically bonded thereto. Additionally, the edges of one or more of first sidewall 42, second sidewall 44, first top wall 46, bottom wall 52, support arm 58, third sidewall 60, and second top wall 64 may be folded over to increase the strength of bracket 20. Furthermore, gussets or braces may be formed or fixed to adjacent walls to further increase the strength of bracket 20.

Figure 5:
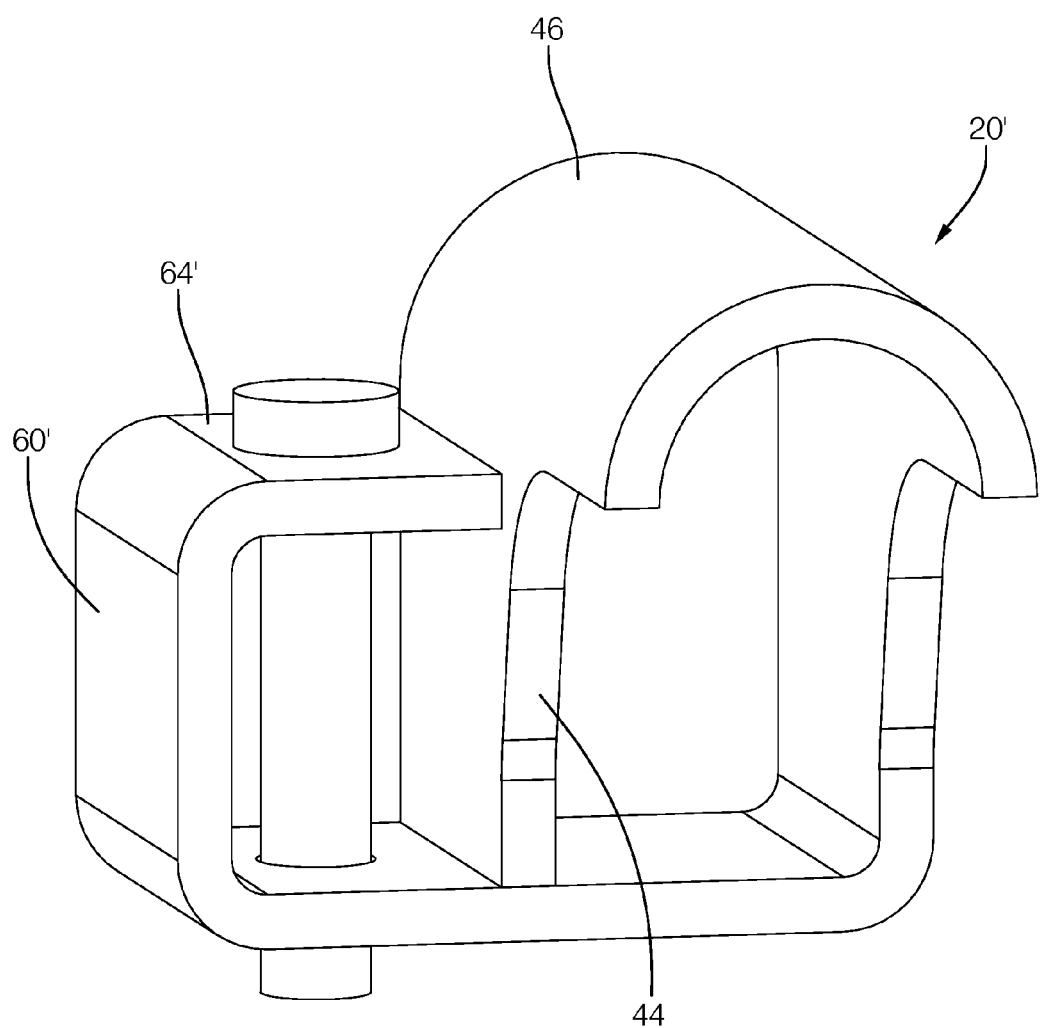
FIG. 5 is an isometric view of an alternative bracket of the fuel rail assembly in accordance with the present invention.

Now with reference to FIG. 5, an alternative bracket 20' may be substituted for bracket 20. Bracket 20' is substantially the same as bracket 20 except that bracket 20' includes a third sidewall 60' that is shortened in length compared to third sidewall 60 of bracket 20. The shortened nature of third sidewall 60' allows a second top wall 64' to be metallurgically bonded to second sidewall 44 rather than to first top wall 46. Consequently, bracket 20' may be more compact in height than bracket 20 which may be desirable in applications with space limitations in the direction of the height of bracket 20.

Figure 6:
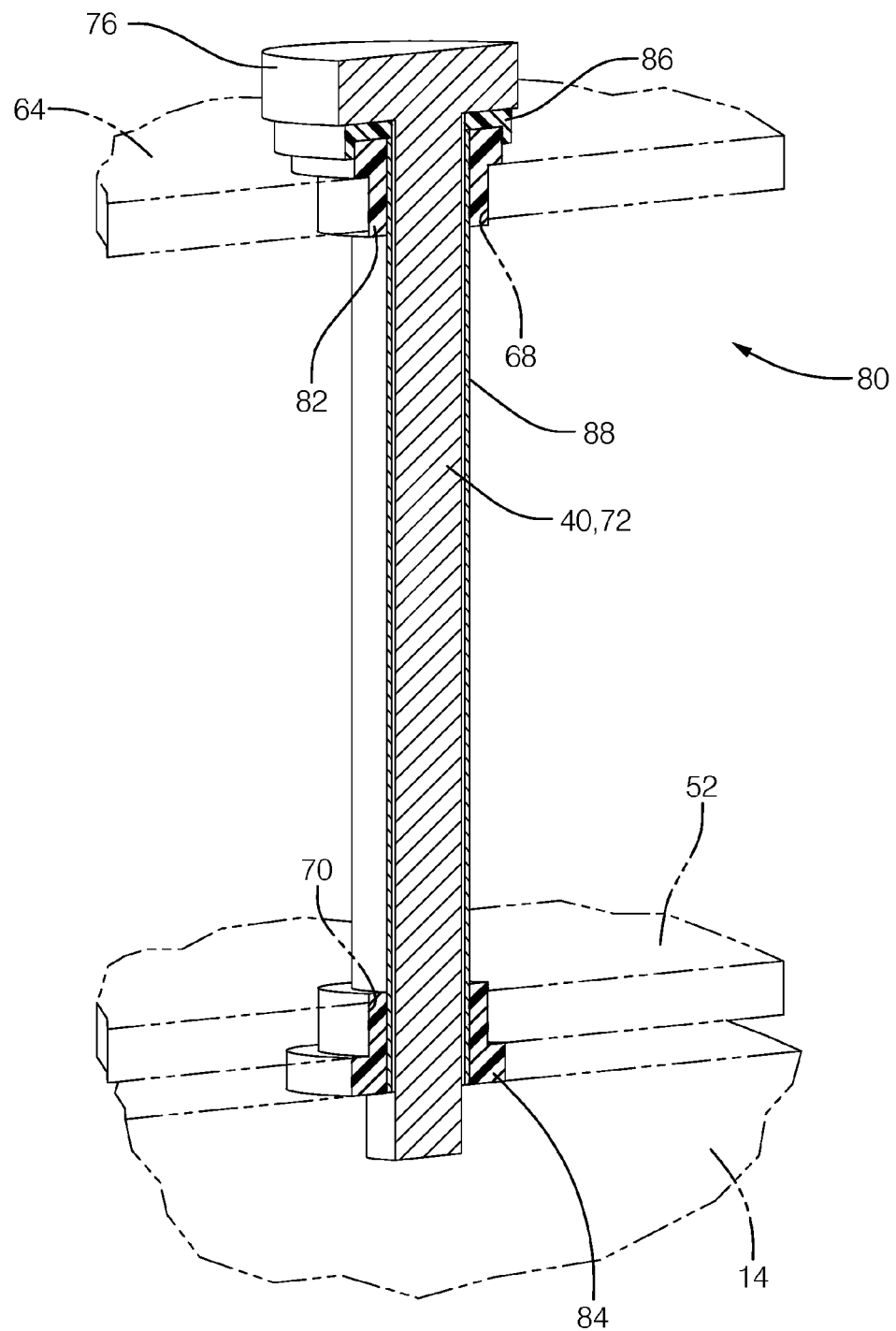
FIG. 6 is an isometric cross-sectional view of an isolation arrangement of the fuel rail assembly in accordance with the present invention.
Figure 7:
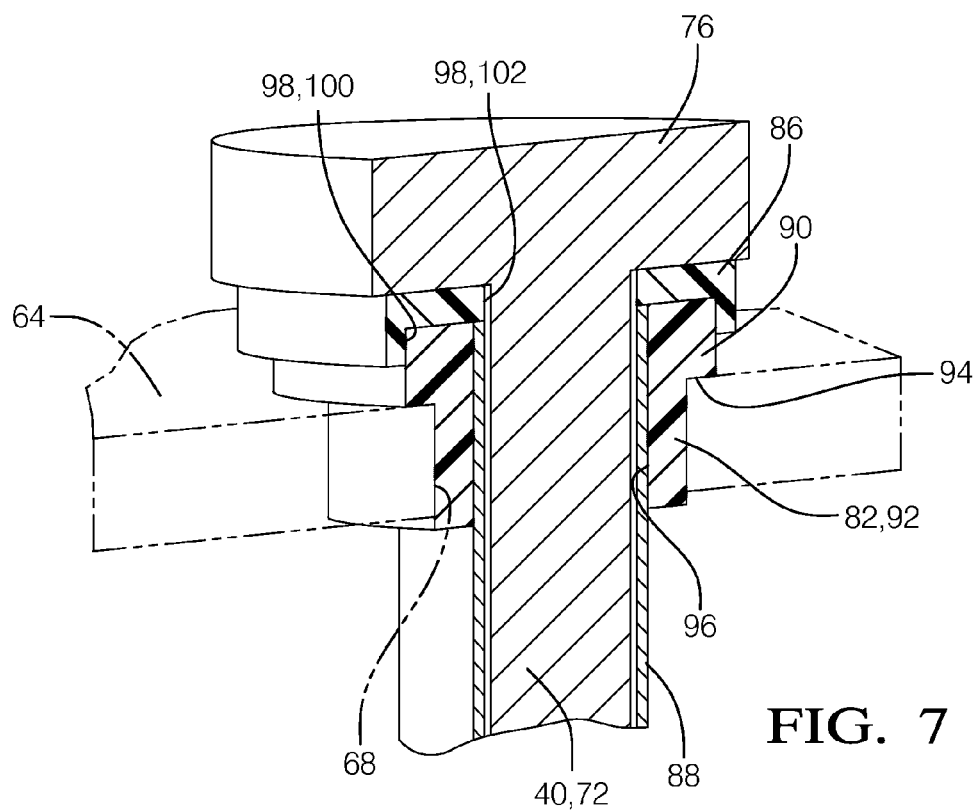
FIG. 7 is an enlarged view of an upper end of the isolation arrangement of FIG. 6.
Figure 8:
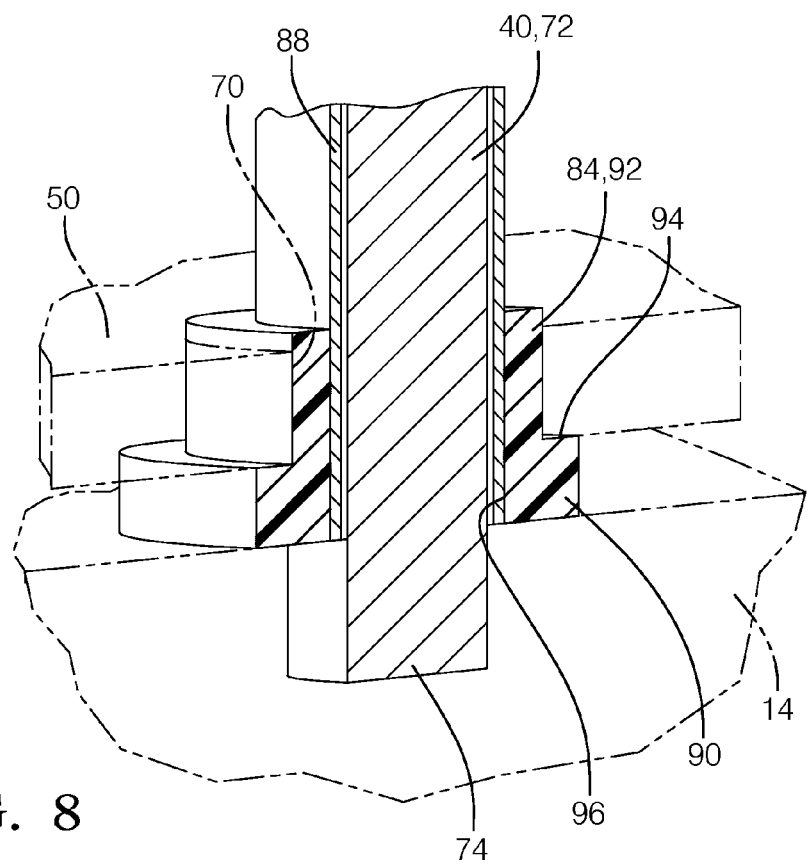
FIG. 8 is an enlarged view of a lower end of the isolation arrangement of FIG. 6.

An isolation arrangement 80 will now be described with reference to FIGS. 6-8.

Isolation arrangement 80 includes an upper isolator 82, a lower isolator 84, a retainer 86, and a compression limiter 88. Compression limiter 88 is a rigid tube which allows bolt 40 to pass therethrough. Compression limiter 88 passes through first bolt hole 68 of second top wall 64 and through second bolt hole 70 of bottom wall 52, and when bolt 40 is tightened, compression limiter 88 is held in compression between bolt head 76 and internal combustion engine 14.

Upper isolator 82 and lower isolator 84 may be substantially the same and each include a larger diameter portion 90 and a smaller diameter portion 92 defining an isolator shoulder 94 where larger diameter portion 90 meets smaller diameter portion 92. Upper isolator 82 and lower isolator 84 each also include a central isolator bore 96 extending therethrough such that compression limiter 88 passes through isolator bore 96 of each of upper isolator 82 and lower isolator 84 in a close fitting relationship. Smaller diameter portion 92 of upper isolator 82 extends into first bolt hole 68 of second top wall 64 and isolator shoulder 94 mates with the outside surface of second top wall 64. Similarly, smaller diameter portion 92 of lower isolator 84 extends into second bolt hole 70 of bottom wall 52 and isolator shoulder 94 mates with the outside surface of bottom wall 52. Upper isolator 82 and lower isolator 84 are made of a vibration damping and resilient material which may be an elastomer, for example only, Neoprene or Silicone.

Retainer 86 is disk-shaped with a stepped bore 98 extending therethrough. Stepped bore 98 defines a larger diameter bore 100 which receives a portion of larger diameter portion 90 of upper isolator 82. Stepped bore 98 also defines a smaller diameter bore 102 which allows bolt 40 to pass through retainer 86. Compression limiter 88 may extend only into larger diameter bore 100 as shown, and consequently, compression limiter 88 is captured between retainer 86 and internal combustion engine 14.

Alternatively, but not shown, compression limiter 88 may extend through smaller diameter bore 102 as well. Retainer 86 is captured between bolt head 76 and upper isolator 82. Retainer 86 may be made of a plastic or metallic material. Based on the shape and size of larger diameter portion 90 of upper isolator 82, retainer 86 is suitably dimensioned and shaped to accommodate the bulging of upper isolator 82 when upper isolator 82 is compressed by tightening of bolt 40. Consequently, while not shown, larger diameter bore 100 may be tapered or curved. While isolation arrangement 80 has been shown and described to include retainer 86, it should now be understood that retainer 86 may be omitted. While not shown, it should now be understood that retainer 86 may be similarly applied to lower isolator 84.

In use, larger diameter portion 90 of upper isolator 82 and retainer 86 are captured between bolt head 76 and second top wall 64 while larger diameter portion 90 of lower isolator 84 is captured between internal combustion engine 14 and bottom wall 52. As bolt 40 is tightened, upper isolator 82 and lower isolator 84 are compressed, but only to the extent allowed by compression limiter 88. Upper isolator 82 and lower isolator 84 are compressed no further after compression limiter 88 is clamped tightly between bolt head 76 and internal combustion engine 14. Upper isolator 82 and lower isolator 84 act to limit the transmission of vibrations generated at least in part by pressure pulsations due to fuel injectors 12 opening and closing under high pressure as fuel source 18 and fuel injectors 12 deliver fuel to internal combustion engine 14 and due to fuel pressure variations caused by the high pressure pump. It should be understood that isolation arrangement 80 may be used with any variations of bracket 20 or 20'.

Figure 9A:
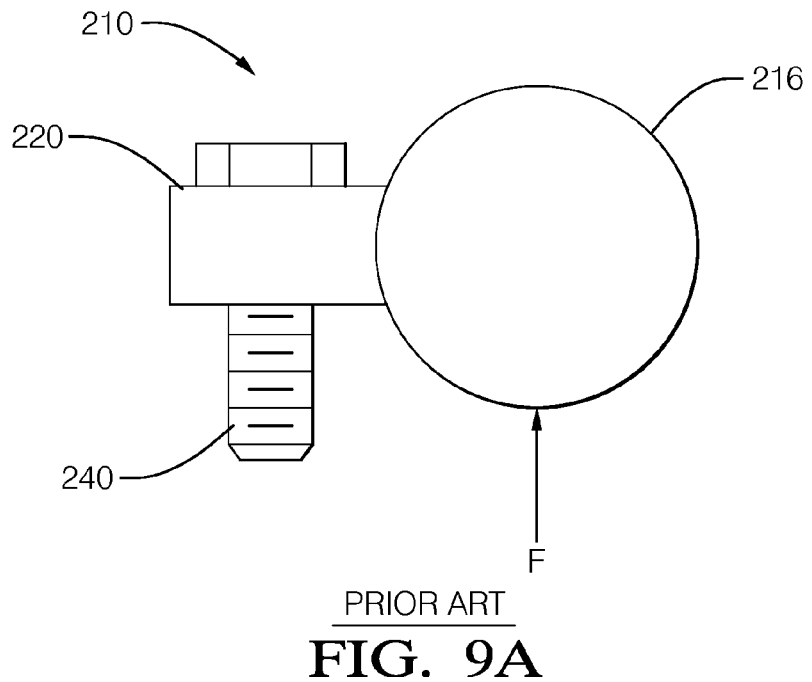
FIG. 9A is a schematic view of a prior art fuel rail assembly illustrating a force applied thereto.
Figure 9B:
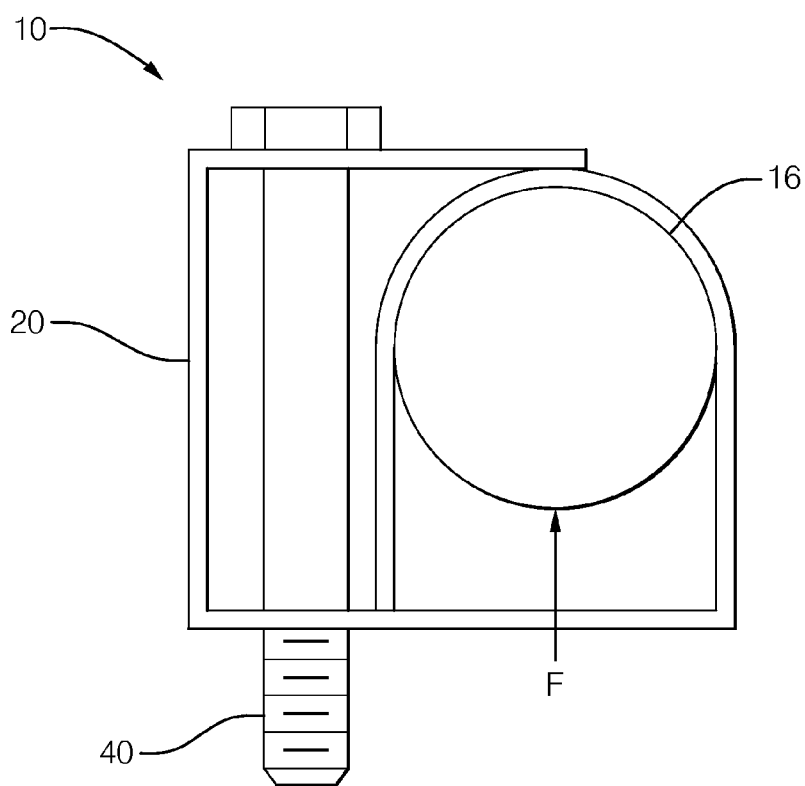
FIG. 9B is a schematic view of the fuel rail assembly in accordance with the present invention illustrating a force applied thereto.

Reference will now be made to FIGS. 9A which illustrates the forces experienced by a prior art fuel rail assembly 210 with a rigid bracket 220 which is rigidly fixed to a fuel rail 216, for example, by brazing. Reference will now also be made to FIG. 9B which illustrates the forces experienced by fuel rail assembly 10 of the present invention. As shown in FIG. 9A, a bolt 240 is used to secure bracket 220 to an internal combustion 214. In operation, fuel rail assembly 210 is subject to a high-frequency force F as a result of a fuel injector (not shown) opening and closing in high frequency while being subject to high fuel pressure. Force F tries to rotate fuel rail assembly 210 counterclockwise (as viewed in FIG. 9A) about bolt 240. As a result, the braze joint between bracket 220 and fuel rail 216 must resist this rotation. Furthermore, since bracket 220 is rigid, bracket 220 does not dampen force F and makes the braze joint between bracket 220 and fuel rail 216 susceptible to fatigue failure. As shown in FIG. 9B, fuel rail assembly 10 is also subject to force F which tries to rotate fuel rail assembly 10 counterclockwise (as viewed in FIG. 9B) about bolt 40. However, since fuel rail 16 is captured within bracket 20, the joint between fuel rail 16 and bracket 20 does not need to resist this rotation. Furthermore, since bracket 20 is made up of a compartmentalized framework of walls 42, 44, 46, 52, 60, and 64 and the disposition/redistribution of the bracket material are such that bracket 20 has improved torsional and bending stiffness, fuel rail assembly 10 has increased resistance against static and fatigue loads.

While this invention has been described in terms of preferred embodiments thereof, it is not intended to be so limited.

We claim:

1. A fuel rail assembly for supplying pressurized fuel to at least one fuel injector of a fuel consuming device, said fuel rail assembly comprising:
    a hollow fuel rail extending along a fuel rail axis, said fuel rail having an inlet for introducing said pressurized fuel into said fuel rail and at least one outlet for dispensing said pressurized fuel from said fuel rail; and
    a bracket for attaching said fuel rail assembly to said fuel consuming device wherein said bracket comprises:
        a fuel rail portion defining a first passage extending therethrough in the same direction as said fuel rail axis for receiving said fuel rail therewithin; and
        a mounting portion adjacent to said fuel rail portion and defining a second passage extending therethrough in the same direction as said fuel rail axis, said mounting portion being configured to receive a fastener for securing said fuel rail assembly to said fuel consuming device.

2. A fuel rail assembly as in claim 1 wherein said pressurized fuel acts to urge said fuel rail assembly away from said fuel consuming device in a direction defining a pressure axis and said fuel rail portion of said bracket comprises:
    a first sidewall laterally spaced from said pressure axis;
    a second sidewall laterally spaced from said pressure axis and said first sidewall such that said fuel rail is between said first sidewall and said second sidewall;
    a first top wall joining a top end of said first sidewall to a top end of said second sidewall; and
    a bottom wall joining a bottom end of said first sidewall to a bottom end of said second sidewall.

3. A fuel rail assembly as in claim 2 wherein said first top wall is contoured to match a portion of the outer periphery of said fuel rail.

4. A fuel rail assembly as in claim 2 wherein said bracket further comprises a support arm extending from said first top wall in the same direction as said fuel rail axis.

5. A fuel rail assembly as in claim 4 wherein said support arm is aligned with said at least one outlet along said fuel rail axis.

6. A fuel rail assembly as in claim 5 wherein said support arm is opposing said at least one outlet.

7. A fuel rail assembly as in claim 4 wherein a smooth contoured transition is formed between said support arm and at least one of said first sidewall and said second sidewall.

8. A fuel rail assembly as in claim 2 wherein said fuel rail assembly is metallurgically bonded to said first top wall.

9. A fuel rail assembly as in claim 2 wherein said bottom end of said second sidewall is metallurgically bonded to said bottom wall.

10. A fuel rail assembly as in claim 2 wherein said first sidewall is substantially parallel to said second sidewall.

11. A fuel rail assembly as in claim 2 wherein said bottom wall is spaced apart from said fuel rail.

12. A fuel rail assembly as in claim 2 wherein said mounting portion of said bracket comprises:
    said second sidewall;
    a third sidewall laterally spaced from said pressure axis and said second sidewall such that said second sidewall is between said first sidewall and said third sidewall.

13. A fuel rail assembly as in claim 12 wherein said mounting portion of said bracket further comprises said bottom wall, and wherein said bottom wall joins a bottom end of said third sidewall to said bottom end of said second sidewall.

14. A fuel rail assembly as in claim 13 wherein said mounting portion of said bracket further comprises a second top wall joining a top end of said third sidewall to said fuel rail portion of said bracket.

15. A fuel rail assembly as in claim 14 wherein said second top wall is metallurgically bonded to said first top wall.

16. A fuel rail assembly as in claim 14 wherein said second top wall is metallurgically bonded to said second sidewall.

17. A fuel rail assembly as in claim 14 wherein said second top wall includes a first aperture therethrough and said bottom wall includes a second aperture therethrough such that said fastener extends through said first aperture and said second aperture, thereby clamping said mounting portion of said bracket to said fuel consuming device.

18. A fuel rail assembly as in claim 17 further comprising an isolation arrangement, said isolation arrangement comprising:
    an upper isolator between said first aperture and said fastener; and
    a lower isolator between said second aperture and said fastener;
    wherein said upper isolator and said lower isolator are made of a vibration damping and resilient material.

19. A fuel rail assembly as in claim 18 wherein said upper isolator comprises:
    a larger diameter portion;
    a smaller diameter portion; and
    an isolator shoulder defined by said larger diameter portion and the smaller diameter portion of said upper isolator;
    wherein said smaller diameter portion of said upper isolator extends into said first aperture and said isolator shoulder of said upper isolator mates with said second top wall.

20. A fuel rail assembly as in claim 19 wherein said fastener is a bolt having a bolt head and said larger diameter portion of said upper isolator is captured between said bolt head and said second top wall.

21. A fuel rail assembly as in claim 18 wherein said lower isolator comprises:
    a larger diameter portion;
    a smaller diameter portion; and
    an isolator shoulder defined by the larger diameter portion and the smaller diameter portion of said lower isolator;
    wherein said smaller diameter portion of said lower isolator extends into said second aperture and said isolator shoulder of said lower isolator mates with said bottom wall.

22. A fuel rail assembly as in claim 21 wherein said fastener is a bolt having a bolt head and said larger diameter portion of said lower isolator is captured between said fuel consuming device and said bottom wall.

23. A fuel rail assembly as in claim 21 wherein said fastener is a bolt having a bolt head and said fuel rail assembly further comprises a compression limiter captured between said bolt head and said fuel consuming device for limiting the compression of said upper isolator and said lower isolator.

* * * * *